United States Patent [19]
Yamamiya

[11] Patent Number: 5,808,997
[45] Date of Patent: Sep. 15, 1998

[54] DISK DRIVE APPARATUS CAPABLE OF RELIABLY RECEIVING DISK CARTRIDGES HAVING BOTH SINGLE AND DOUBLE SIDED DISKS

[75] Inventor: Kunio Yamamiya, Sagamihara, Japan

[73] Assignee: Olympus Optical Co., Ltd., Tokyo, Japan

[21] Appl. No.: 669,910

[22] Filed: Jun. 25, 1996

[30] Foreign Application Priority Data

Jun. 27, 1995 [JP] Japan .................................. 7-160864
Aug. 22, 1995 [JP] Japan .................................. 7-213673

[51] Int. Cl.$^6$ .................................................. G11B 17/04
[52] U.S. Cl. .................................................. 369/77.2
[58] Field of Search .................................. 369/75.1, 75.2, 369/77.1, 77.2; 360/99.02, 99.06

[56] References Cited

U.S. PATENT DOCUMENTS

| | | | |
|---|---|---|---|
| 4,890,276 | 12/1989 | Ono et al. | 369/77.2 |
| 5,446,711 | 8/1995 | Yamamiya | 369/44.14 |
| 5,526,342 | 6/1996 | Akiyama et al. | 369/291 |
| 5,583,834 | 12/1996 | Kanada et al. | 369/77.2 |

Primary Examiner—Stuart S. Levy
Assistant Examiner—George J. Letscher
Attorney, Agent, or Firm—Frishauf, Holtz, Goodman, Langer & Chick

[57] ABSTRACT

A drive apparatus has vertically movable blocks on opposite lower front portions of a cartridge holder. On a base incorporated in the drive apparatus, there is provided a slide plate which moves when a disk cartridge is inserted in the drive apparatus. The slide plate has a cam for raising the blocks. A positioning pin and a pushing switch are located on the upper surface of each block. Each pushing switch has two switch elements. That one of the pushing switches which is located on the right block outputs "0, 0" when a single-sided disk cartridge is inserted upside down, "1, 1" when the single-sided disk cartridge is inserted correctly, and "0, 1 " when a double-sided disk cartridge is inserted.

18 Claims, 11 Drawing Sheets

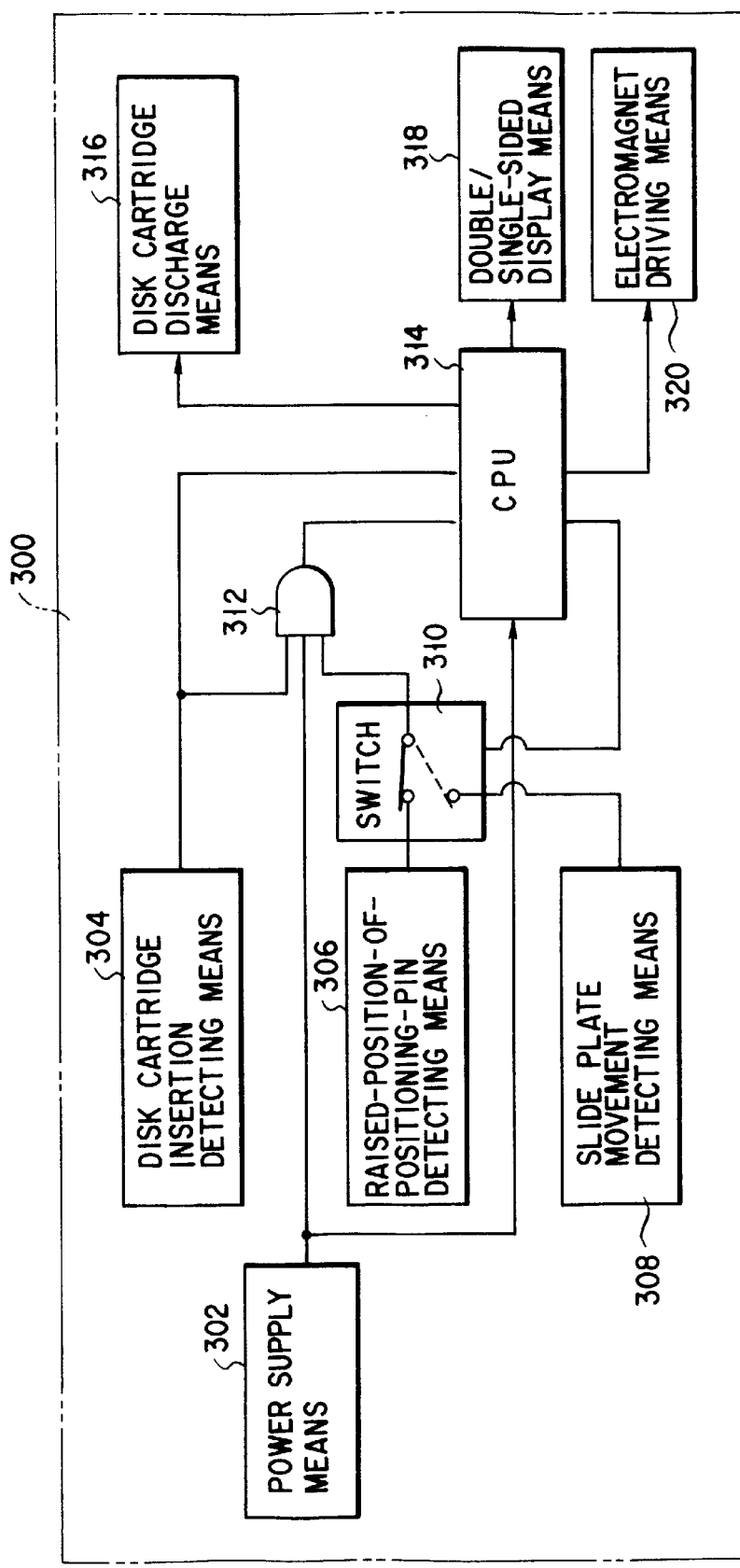
F I G. 1

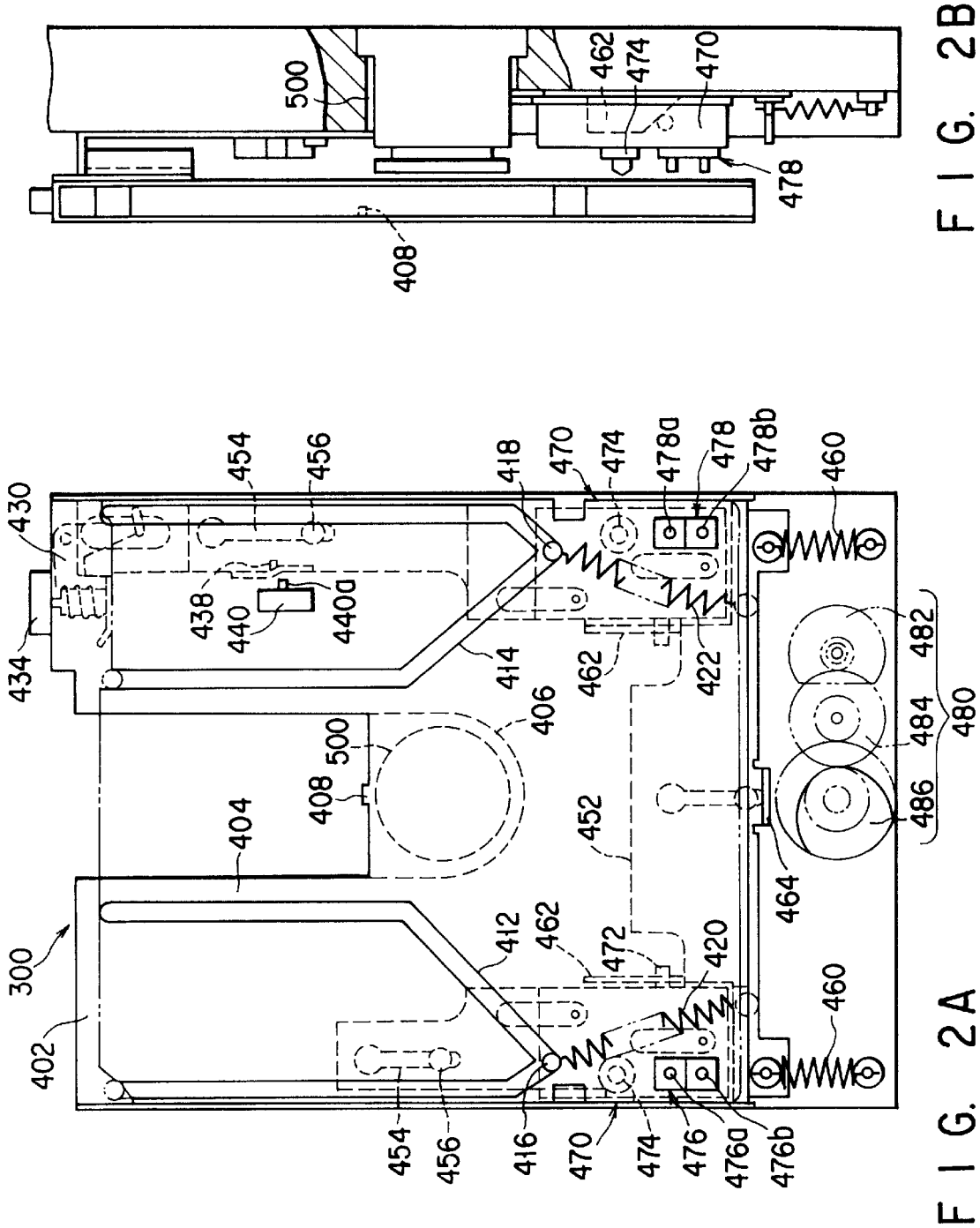

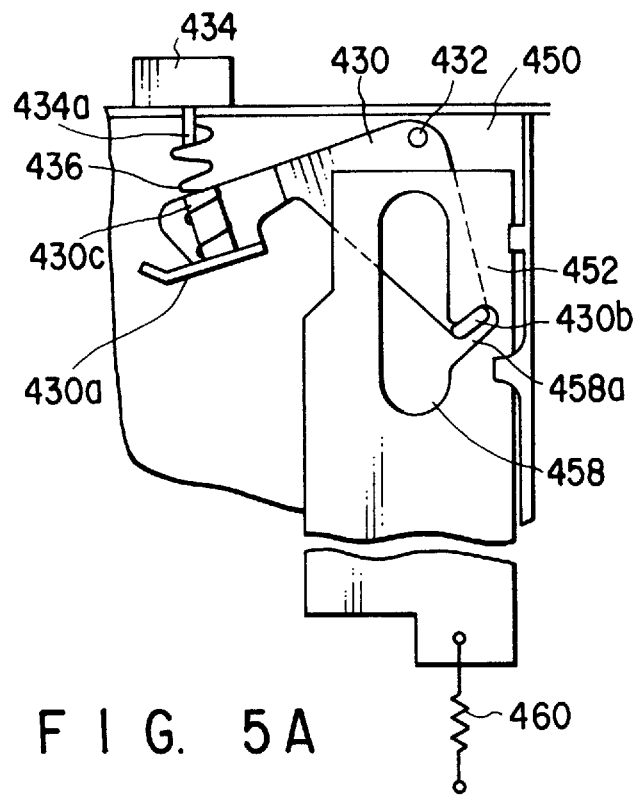
F I G. 5A
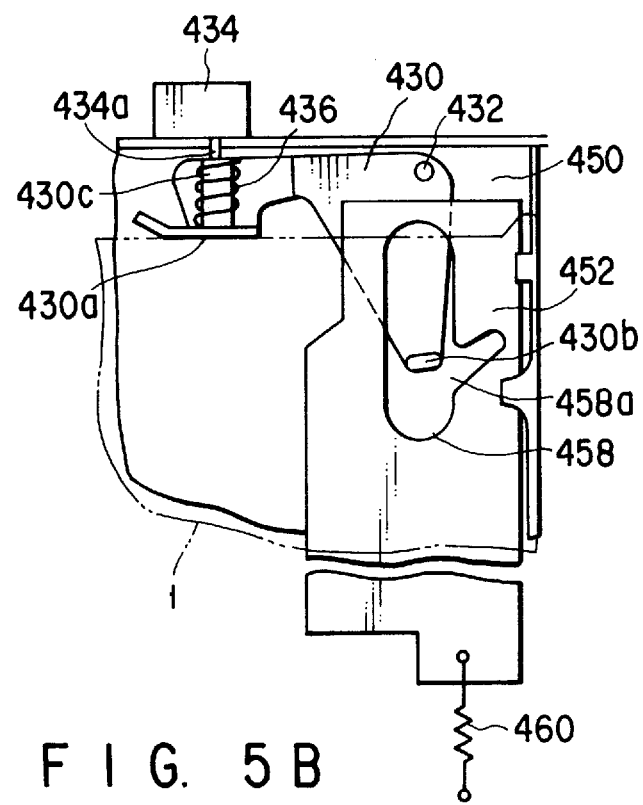
F I G. 5B

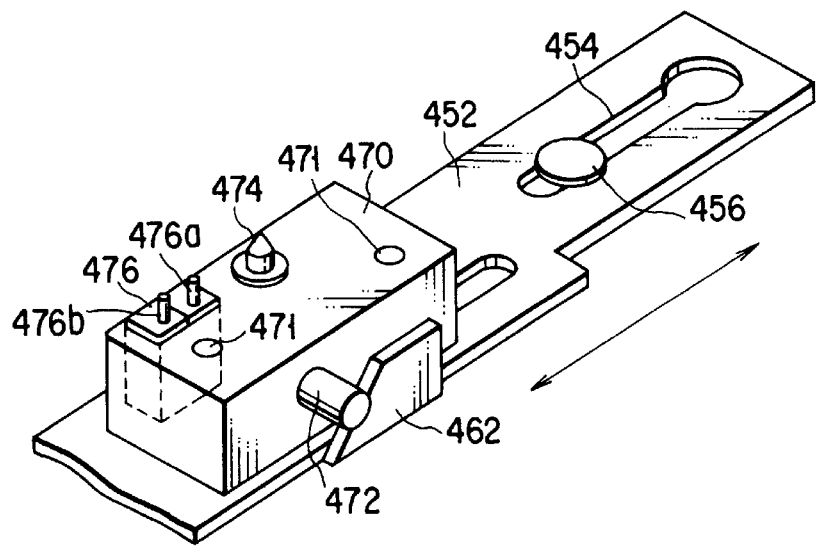
F I G. 6
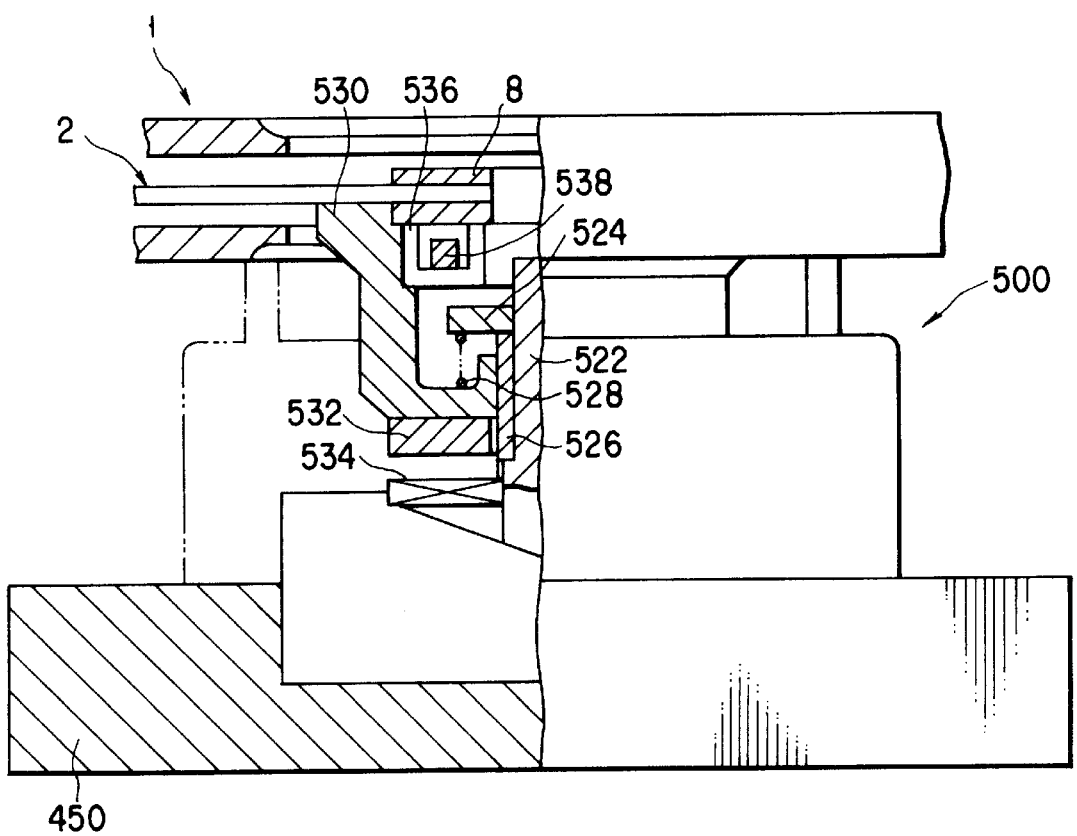
F I G. 7

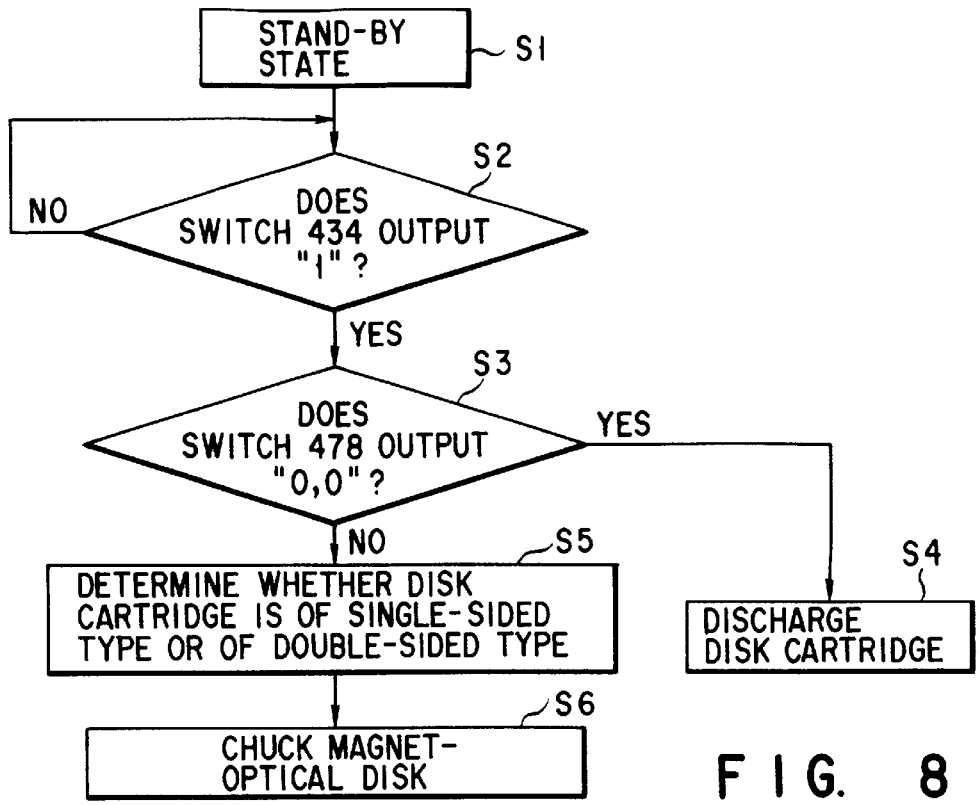
F I G. 8
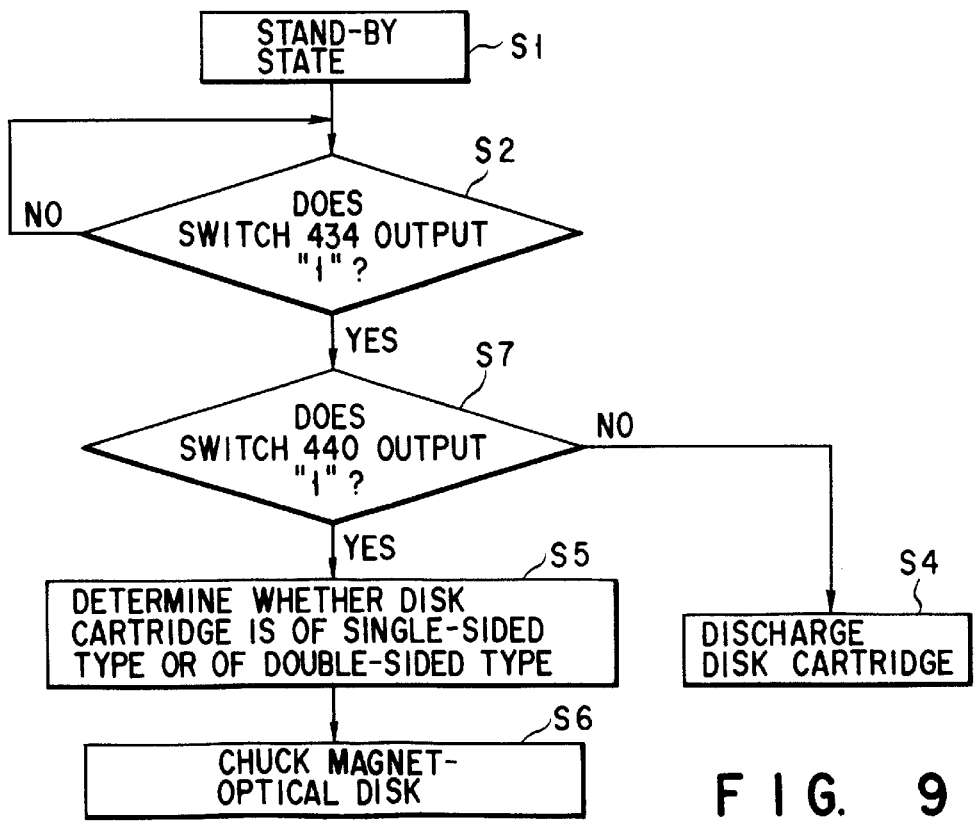
F I G. 9

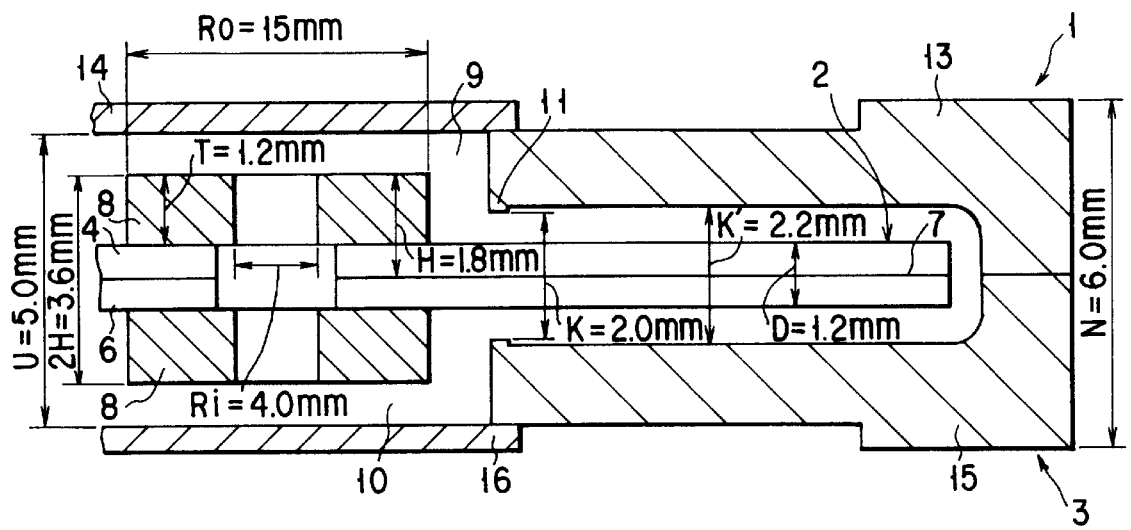
F I G. 13
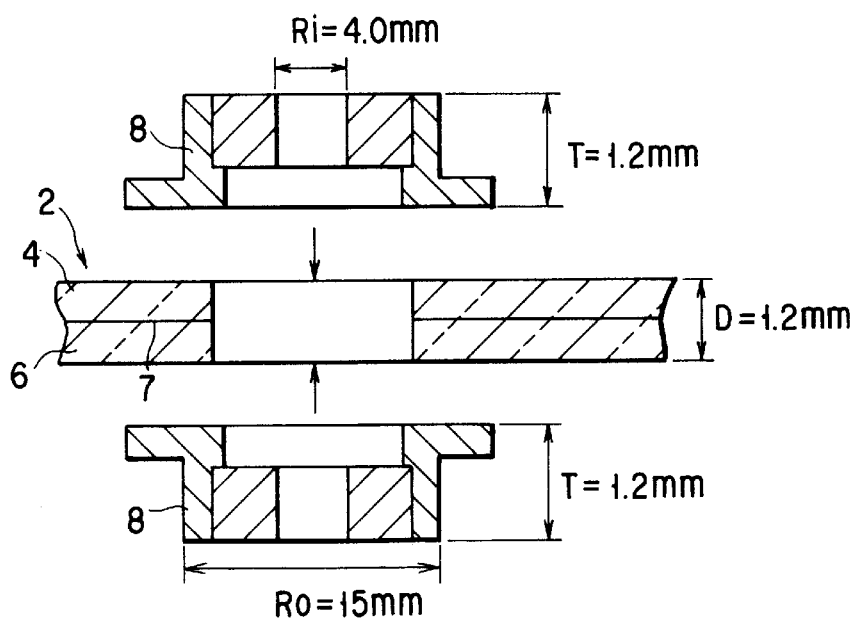
F I G. 14

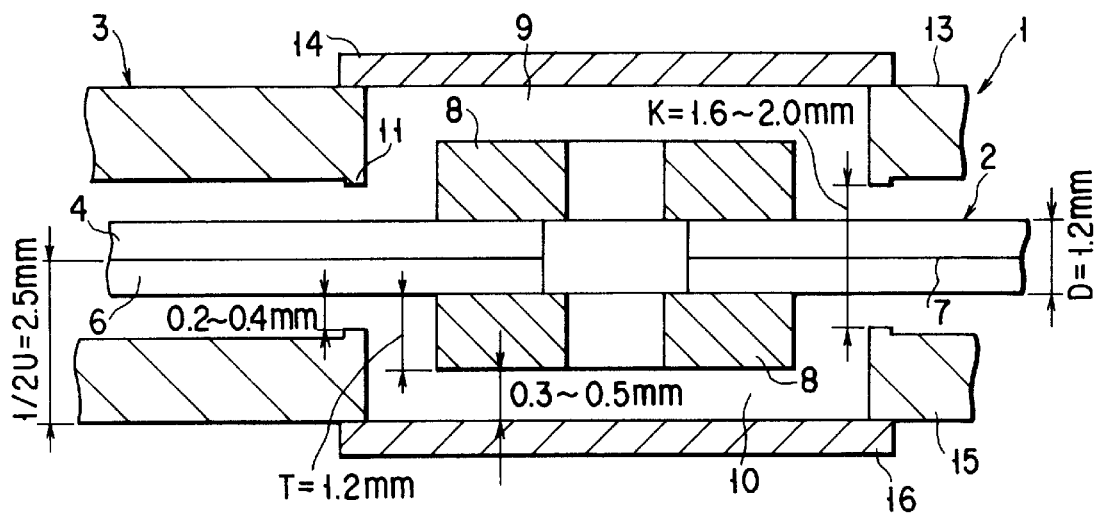
F I G. 15
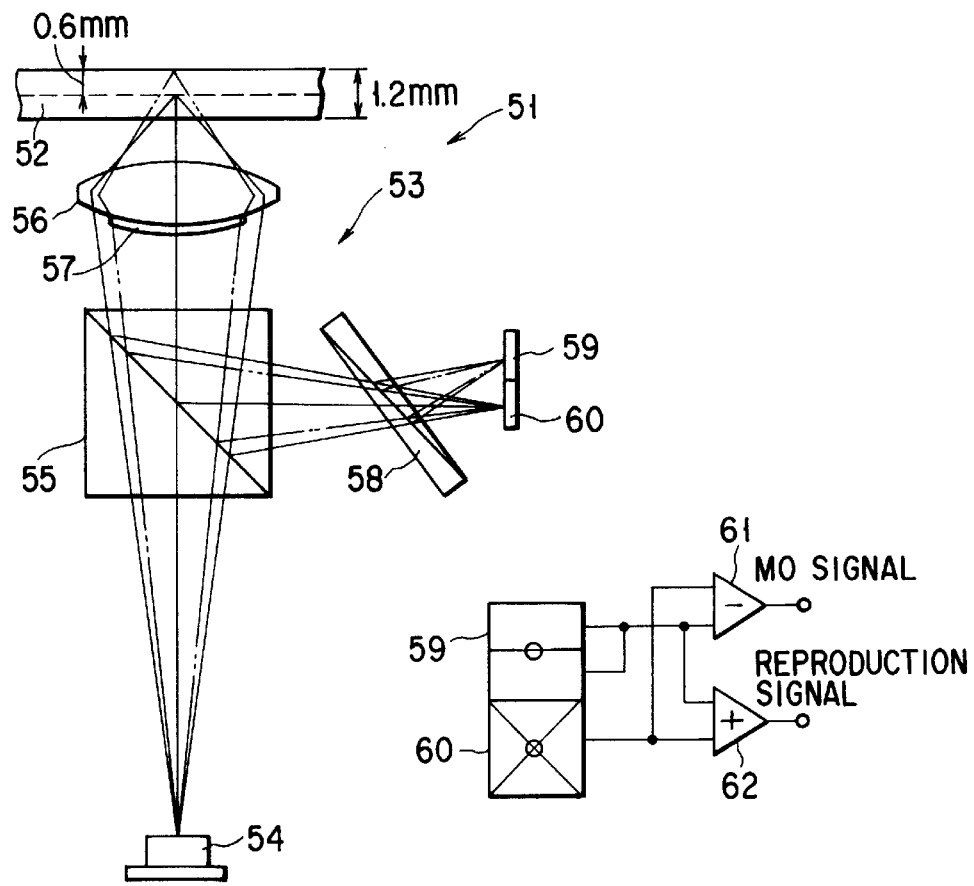
F I G. 16A    F I G. 16B

DISK DRIVE APPARATUS CAPABLE OF RELIABLY RECEIVING DISK CARTRIDGES HAVING BOTH SINGLE AND DOUBLE SIDED DISKS

BACKGROUND OF THE INVENTION

1. Field of the Invention

This invention relates to a disk cartridge with a disk-shaped optical recording medium rotatably contained therein, and its drive apparatus.

2. Description of the Related Art

A magneto-optical disk cartridge of 3.5 inches contains therein a single-sided recording magneto-optical disk. Because of the locations of a shutter, an erroneous erasure preventing mechanism, etc. incorporated in the cartridge, it is predetermined in which direction the disk cartridge should be inserted into a drive apparatus for driving the same. Further, since the magneto-optical disk contained in the cartridge is of a single-sided recording type, it is also predetermined which surface of the cartridge should be directed upward at the time of inserting the same into the drive apparatus. The drive apparatus has an erroneous insertion preventing mechanism for preventing insertion of a disk cartridge when it is tried to be inserted in a wrong direction or with a wrong side directed upward.

The erroneous insertion preventing mechanism will be described with reference to some drawings. Referring first to FIG. 17, a currently available 3.5-inch magneto-optical disk cartridge will be explained. A disk cartridge 100 has a single-sided recording magneto-optical disk 110 and a case 102 which contains the disk 110 rotatably. The case 102 has an opening for exposing the disk 110, and a shutter 112 for closing the opening. The case 102 has a projection 130 located at a front corner and having an inclined surface with its normal line directed inside, and also has an inclined portion 132 having an inclined surface with its normal line directed outside. The case 102 further has an alignment hole 138 and a positioning hole 140, which are formed in one surface thereof for receiving therein a pair of positioning pins when it is loaded in the drive apparatus. These pins fix the case in a predetermined position in the drive apparatus. The case 102 also has an erroneous erasure preventing mechanism 142 for interruption of writing data into the magneto-optical disk 110.

As is shown in FIG. 18A, the erroneous insertion preventing mechanism includes an arm 154 rotatably attached to a cartridge holder 152 into which the disk cartridge 100 is to be inserted in a direction indicated by the arrow, and a spring 156 urging the arm 154 clockwise. The arm 154 has a downwardly bent end portion 154a. The spring 156 has its one end fixed to the cartridge holder 152, and the other end fixed to a portion located in the vicinity of the end portion 154a of the arm 154. Thus, the arm 154 is urged clockwise, and the end portion 154a is usually positioned inside a cutout 152a formed in the cartridge holder 152.

When the disk cartridge 100 is correctly inserted, the end portion 154a of the arm 154 contacts the inclined portion 132 of a configuration shown in FIG. 18B, and therefore the cartridge 100 can enter a more inner portion of the holder while pushing the end portion 154a of the arm 154 to the outside, as is indicated by the imaginary line.

When, on the other hand, the cartridge 100 is inserted in a wrong direction or with a wrong side directed upward, the end portion 154a of the arm 154 contacts the projection 130 of a configuration shown in FIG. 18C or a corner as shown in FIG. 18D. As a result, the arm 154 does not rotate and stays in a position indicated by the solid line. Accordingly, the disk cartridge 100 cannot further advance.

By virtue of the erroneous insertion preventing mechanism, the disk cartridge can always be mounted correctly in the drive apparatus.

Although the above-described disk cartridge contains a single-sided recording disk, a disk cartridge with a double-sided recording disk is expected to appear. Such a cartridge dedicated to a double-sided recording disk may have the same structure at both sides of the case. In other words, this cartridge will have the upper-side structure shown in FIG. 17 at both upper and lower sides.

In addition, such a drive apparatus will be demanded, as is applicable to both a disk cartridge with a single-sided recording disk, and a disk cartridge with a double-sided recording disk. This drive apparatus must permit entrance of a disk cartridge irrespective of whether the cartridge contains a single-sided recording disk or a double-sided recording disk, and irrespective of which side of the cartridge is directed upward.

As described above, the disk cartridge 100, which contains a single-sided recording disk, has the alignment hole 138 and the positioning hole 140 formed in one side of the case 102 for receiving a pair of positioning pins of the drive apparatus. However, the opposite side of the case 102 has no alignment hole and positioning hole. Therefore, if the disk cartridge 100 is inserted upside down, the positioning pin of the drive apparatus contacts the case 102 and hence cannot rise any higher, with the result that the turn table of the drive apparatus will turn without the disk.

In light of the above, it is desirable that the drive apparatus, which is applicable to both a disk cartridge with a single-sided recording disk and that with a double-sided recording disk, has a mechanism for discharging a disk cartridge when the cartridge contains a single-sided recording disk and is inserted upside down.

Although the above described problems concern the 3.5-inch magneto-optical disk cartridge, the same can be said of other types of cartridges. For example, currently available 5-inch magneto-optical disk cartridges contain double-sided recording magneto-optical disks. These cartridges could contain single-sided recording magneto-optical disks. In this case too, the above described problems are also encountered.

SUMMARY OF THE INVENTION

It is the object of the invention to provide a drive apparatus with a function for recognizing an inserted disk cartridge. More specifically, the object of the invention is to provide a drive apparatus applicable to both a disk cartridge with a single-sided recording disk and a disk cartridge with a double-sided recording disk, and capable of detecting whether a cartridge with a single-sided recording disk is inserted upside down, and discharging the cartridge if it is.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment and modifications of the invention, and together with the general description given above and the detailed description of the preferred embodiment given below, serve to explain the principle of the invention.

FIG. 1 is a schematic block diagram, showing a drive apparatus according to the embodiment of the invention;

FIGS. 5A and 5B are views, showing a trigger arm and its peripheral elements incorporated in the drive apparatus in FIGS. 2A and 2B;

FIG. 6 is a perspective view of a vertically moving block and part of a slide plate, which are located at a left portion of the drive apparatus in FIGS. 2A and 2B;

FIG. 7 is a partial sectional view of a disk rotating device;

FIG. 8 is a flowchart, illustrating an operation of the drive apparatus of the invention;

FIG. 9 is a flowchart, illustrating another operation of the drive apparatus of the invention;

FIG. 13 is a partial sectional view, taken along lines XIII—XIII in FIGS. 11 and 12;

FIG. 14 is an exploded sectional view of a hub and its periphery incorporated in another type of double-sided disk cartridge;

FIG. 15 is an enlarged view of a hub and its periphery shown in FIG. 13;

FIG. 16A is a view, showing an optical system incorporated in the drive apparatus and corresponding to the disk cartridge in FIGS. 11 and 12;

FIG. 16B is a circuit diagram, showing a reproduction signal generating section incorporated in the optical system in FIG. 16A;

DETAILED DESCRIPTION OF THE PREFERRED EMBODIMENTS

Figure 3:
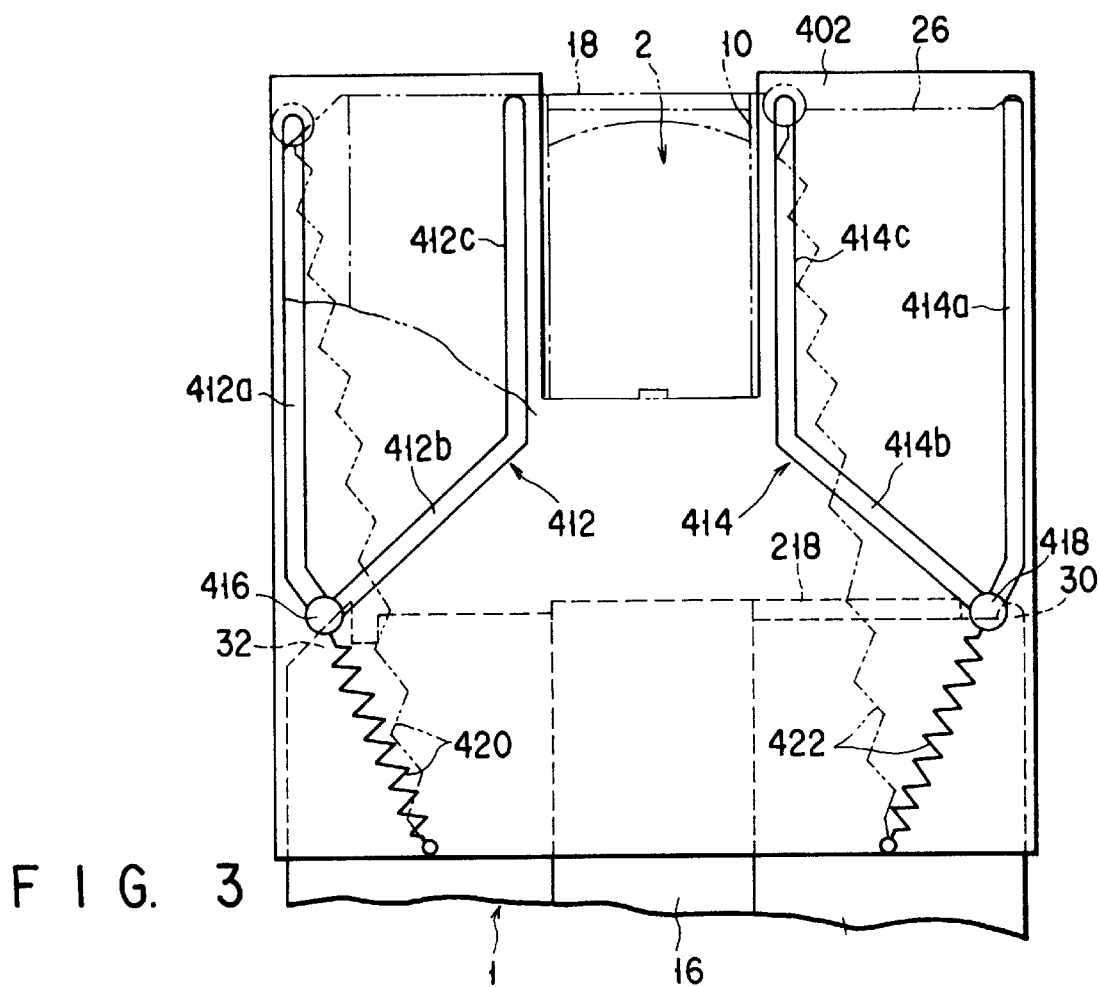
FIG. 3 is a view of a shutter opening/closing mechanism incorporated in the drive apparatus.

Referring to the drawings, a drive apparatus according to the embodiment of the invention will be described. The drive apparatus is enable to drive both a disk cartridge which contains a single-sided recording magneto-optical disk, and a disk cartridge which contains a double-sided recording magneto-optical disk. The disk cartridge which contains a single-sided recording magneto-optical disk will hereinafter be referred to as "single-sided disk cartridge", and the disk cartridge which contains a double-sided recording magneto-optical disk as "double-sided disk cartridge". Further, where it does not matter whether the disk cartridge is the single-sided disk cartridge or the double-sided disk cartridge, it will be referred to as simply "disk cartridge".

Figure 17:
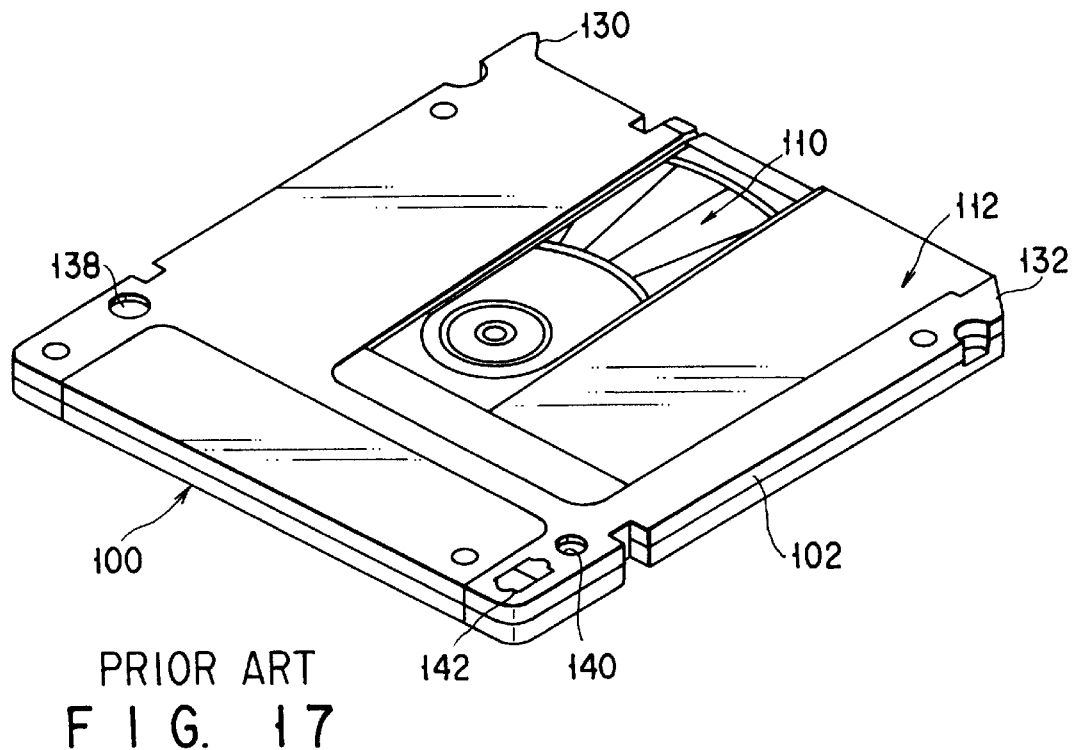
FIG. 17 is a perspective view, showing the front side of a conventional 3.5-inch magneto-optical disk cartridge.
Figure 18A:
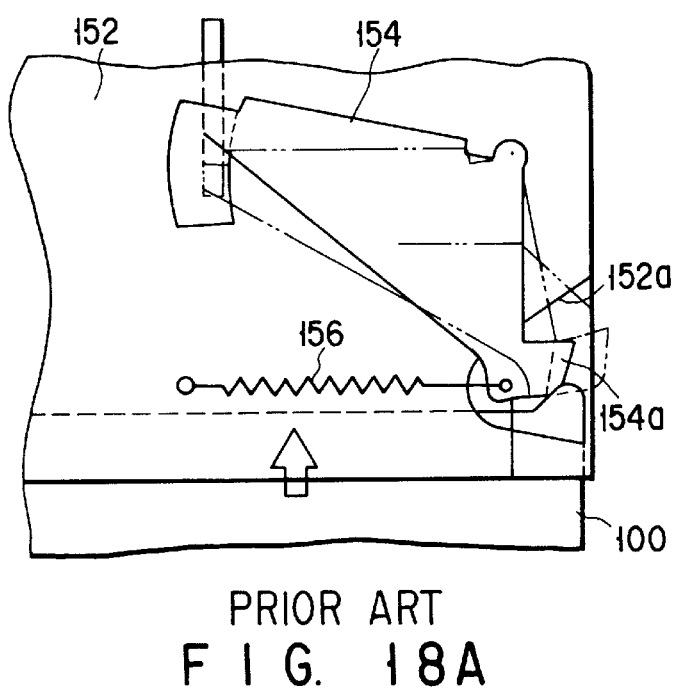
FIGS. 18A to 18D are views, useful in explaining a conventional erroneous insertion preventing mechanism.
Figure 18B:
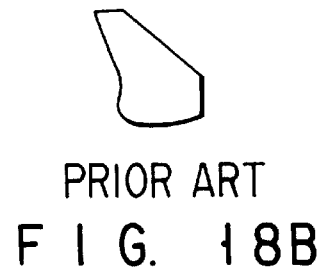
Figure 18C:
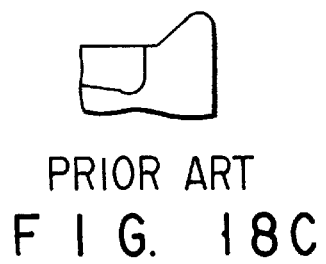
Figure 18D:
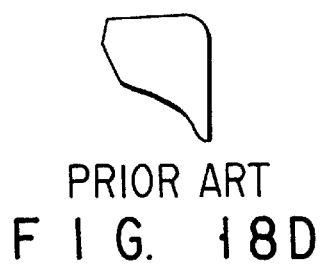

The single-sided disk cartridge has already been described referring to FIG. 17 as reference numeral 100. The double-sided disk cartridge will be described in detail later referring to FIGS. 11 and 12. In the drawings, the double-sided disk cartridge is illustrated as reference numeral 1. In the following description, the simply referred disk cartridge is denoted representatively with the reference numeral 1.

First, the drive apparatus will be roughly described. As is shown in FIG. 1, the drive apparatus 300 includes power supply means 302, disk cartridge insertion detecting means 304, raised-position-of-positioning-pin detecting means 306 (hereinafter referred to simply as "raised position detecting means"), slide plate displacement detecting means 308, and a CPU 314 for controlling the overall apparatus. The raised position detecting means 306 and the slide plate displacement detecting means 308 are connected to the CPU 314 via a switch 310 and an AND circuit 312.

The drive apparatus 300 further includes disk cartridge discharging means 316 for discharging a single-sided disk cartridge inserted upside down, single-sided/double-sided display means 318 for indicating whether the mounted magneto-optical disk is of a single-sided type or of a double-sided type, and electromagnetic driving means 320 for raising a turn table for rotating the magneto-optical disk, by an amount depending upon whether the mounted magneto-optical disk is of the single-sided type or of the double-sided type.

Figures 2A, 2B:
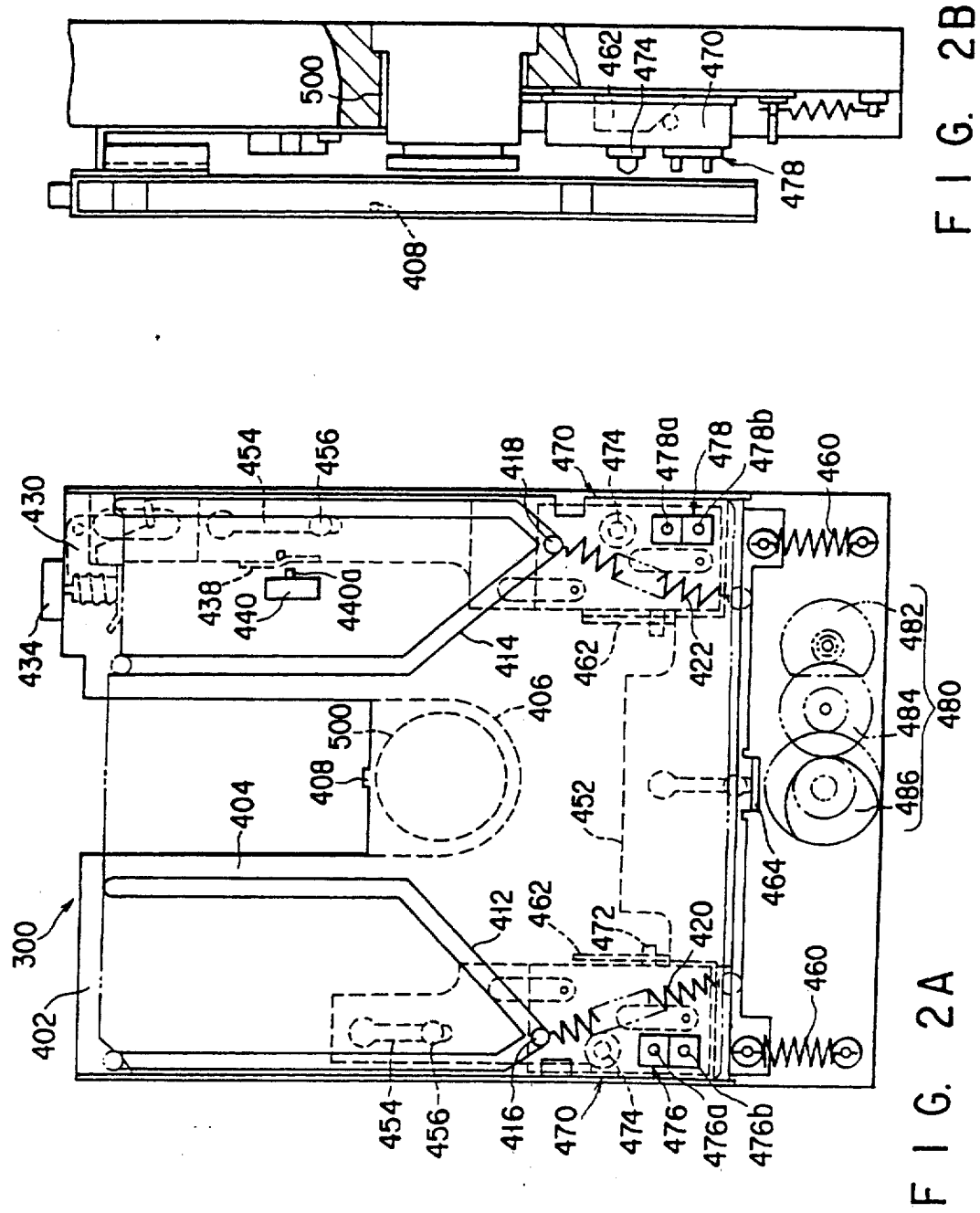
FIG. 2A is a top view of the drive apparatus in FIG. 1.
FIG. 2B is a side view of the drive apparatus in FIG. 1.
Figure 11:
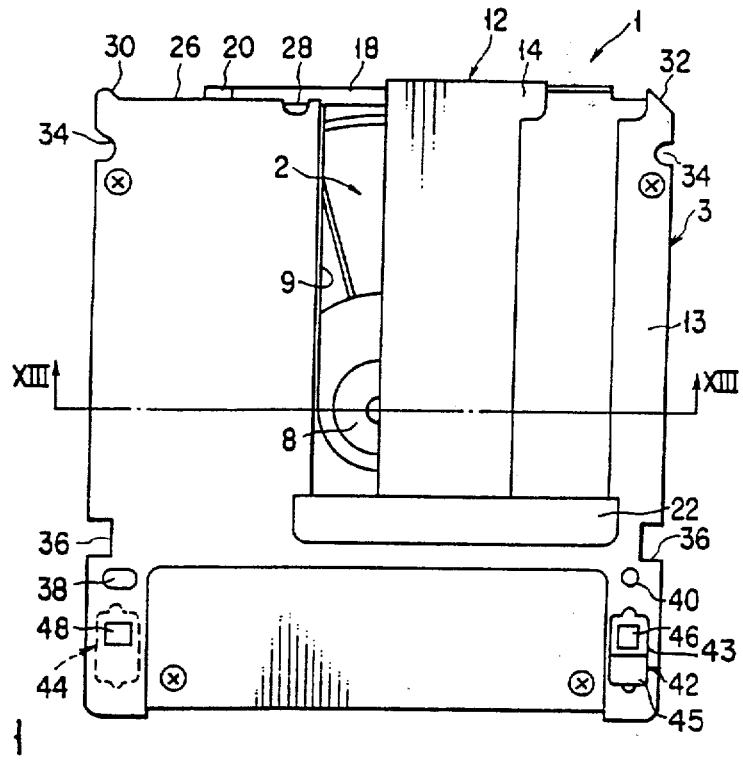
Figure 12:
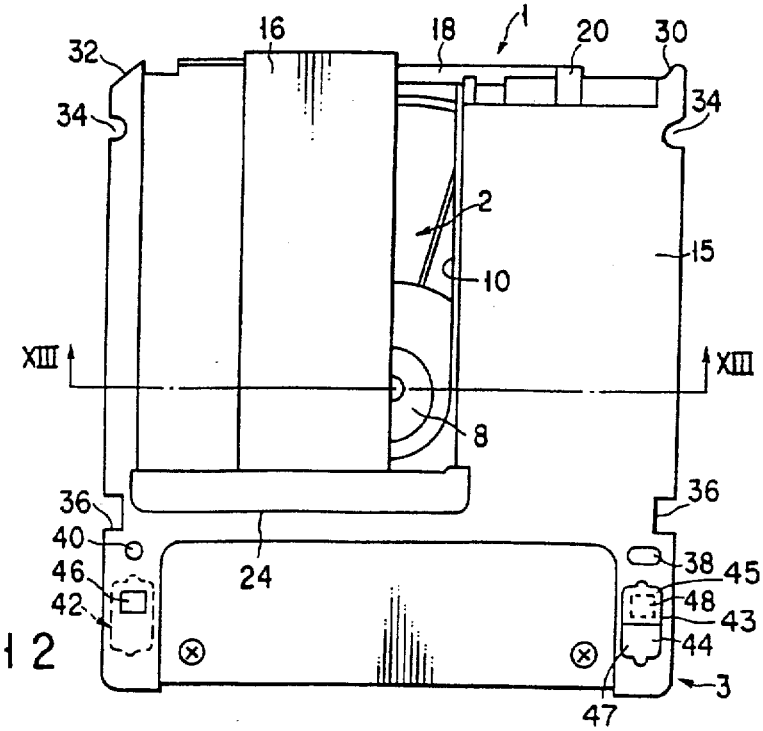

The specific structure of the drive apparatus 300 will be described in detail. As is shown in FIGS. 2A and 2B as well FIG. 3, the drive apparatus 300 has a cartridge holder 402 for receiving a disk cartridge 1. The cartridge holder 402 has an opening 406 on the side of an optical head. Where the disk cartridge 1 is mounted in the drive apparatus, a recording area and a hub incorporated in a magneto-optical disk 2 are exposed through the opening 406.

An opening 404 is formed in a side opposite to the side in which the opening 406 is formed. A projection 408 is provided at a center portion of the edge which defines the opening 404, for preventing the disk cartridge 1 from being inserted in a wrong direction. If the wrong end of the cartridge 1 is inserted, the projection 408 contacts the disk cartridge 1 and prevents a further advance of the same. If, on the other hand, the cartridge 1 is correctly inserted, the shutter of the cartridge 1 is opened by a shutter opening/closing mechanism, which will hereinafter be described. Accordingly, the projection 408 does not contact with the cartridge 1, and does not interrupt the entrance of the cartridge 1. In other words, a configuration and a location of the projection 408 are selected so as to allow the disk cartridge with the shutter opened to be inserted, and to stop the disk cartridge with the shutter closed to be inserted.

The shutter opening/closing mechanism will now be described. As is shown in FIGS. 2A, 2B and 3, the cartridge holder 402 has cam slits 412 and 414 arranged symmetrical with respect to the line of a direction in which the cartridge is inserted and discharged. Shutter opening pins 416 and 418 are slidably received in the cam slits 412 and 414, and urged toward the insertion port by means of tension springs 420 and 422, respectively. The tension springs 420 and 422 are arranged symmetrical with respect to the line of the direction of insertion, and each has an end fixed to the portion close to the insertion port of the cartridge holder 402.

The cam slit 412 has a slit portion 412a extending straight along an edge of the cartridge holder 402, a slit portion 412b obliquely extending toward a center portion of the cartridge holder 402, and a slit portion 412c extending from the slit portion 412b toward the opening 404. Similarly, the cam slit 414 has a slit portion 414a extending straight along another edge of the cartridge holder 402, a slit portion 414b obliquely extending toward a center portion of the cartridge holder 402, and a slit portion 414c extending from the slit portion 414b toward the opening 404.

Figure 4A:
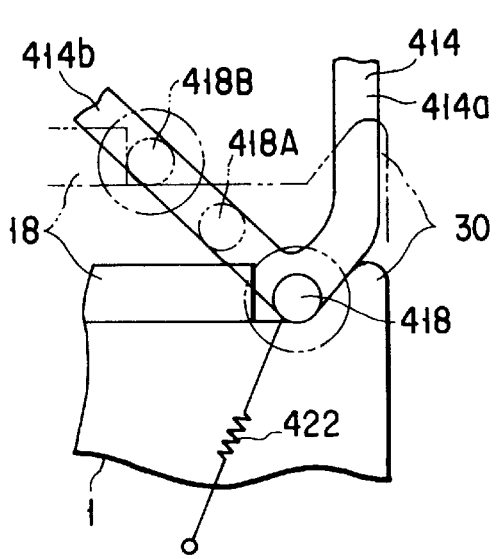
FIGS. 4A and 4B are views, useful in explaining the operation of the opening/closing mechanism of FIG. 3.
Figure 4B:
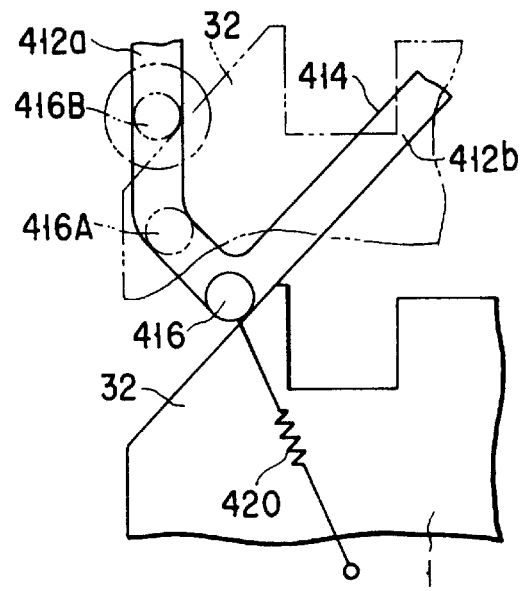

Referring then to FIGS. 4A and 4B, the operation of the shutter opening/closing mechanism will be described. Where the disk cartridge 1 is inserted in a state as shown in FIG. 3, the opening pin 418 is engaged with a projection 30 of the cartridge 1 as shown in FIG. 4A. Since the opening pin 418 is pushed to a more inner portion of the holder 402 by the inclined surface of the projection 30 in accordance with the advance of the cartridge 1, it enters the obliquely extending slit portion 414b, and slides to a more inner portion along the slit portion 414b as indicated by reference numerals 418A and 418B. While moving to a more inner portion of the holder 402 along the slit portion 414b, the opening pin 418 continuously pushes an opening pin receiver 18 of a shutter incorporated in the disk cartridge 1, to a more inner portion of the holder 402, thereby opening the shutter 12.

On the other hand, as is shown in FIG. 4B, the opening pin 416 is engaged with an inclined portion 32 of the disk cartridge 1. In accordance with the insertion of the disk cartridge 1, the opening pin 416 is pushed by the inclined portion 32 to a more outer portion of the cartridge holder 402, and enters the slit portion 412a extending straight along an edge of the holder 402. Subsequently, the pin 416 slides along the slit portion 412a as indicated by reference numerals 416A and 416B.

As is shown in FIGS. 2A and 2B, the drive apparatus has a slide plate 452 which slides after the disk cartridge has been inserted. The plate 452 drives a positioning mechanism for holding the disk cartridge in a predetermined position. The positioning mechanism will be described later. The slide plate 452 has a plurality of slits 454, through which guide pins 456 fixed to a base 450 pass. Thus, the slide plate 452 is slidably attached to the base 450 in the insertion/discharge direction of the disk cartridge. The front end of the slide plate 452 is connected to springs 460 fixed to the base 450, and is urged toward the front side of the drive apparatus.

As is shown in FIGS. 5A and 5B, the slide plate 452 has a slit 458 with a cutout 458a at a right rear end portion thereof. Further, the base 450 has a substantially L-shaped rotary lever, i.e. a trigger arm 430 rotatable about a shaft 432. The trigger arm 430 is urged counterclockwise by a compression spring 436. The trigger arm 430 is provided, at an end thereof, with a pivoting chip 430a to be brought into contact with the disk cartridge 1, and at the other end, with an engagement claw 430b to be engaged with the cutout 458a of the slit 458.

Before the disk cartridge 1 will be inserted, the engagement claw 430b of the trigger arm 430 is engaged with the cutout 458a of the slit 458, thereby the slide plate 452 is kept in the position shown in FIG. 5A, against the force of the spring 460.

When the disk cartridge 1 is inserted, the pivoting chip 430a of the trigger arm 430 is pushed by the tip of the disk cartridge 1, thereby the trigger arm 430 is rotated and the engagement claw 430b is disengaged from the cutout 458a as shown in FIG. 5B. As a result, the slide plate 452 is moved toward the front side of the drive apparatus 300 by the force of the spring 460.

FIGS. 2A, 2B and 5B show the moment at which the engagement claw 430b is disengaged from the cutout 458a, and before the slide plate 452 is moved toward the front side of the drive apparatus 300.

The drive apparatus 300 is equipped with a mechanism for detecting the insertion of the disk cartridge 1. Referring to FIGS. 5A and 5B, the insertion detecting mechanism includes a pushing switch 434 located on the base 450, and a pin 430c provided on the reverse side of the pivoting chip 430a of the trigger 430 for turning on and off the pushing switch 434.

Where the disk cartridge 1 is not inserted, the pin 434a of the pushing switch 434 projects as shown in FIG. 5A, and the pushing switch 434 outputs "0" which indicates that the switch is turned off.

When the disk cartridge 1 is inserted, the pin 434a of the pushing switch 434 is pushed as shown in FIG. 5B, and the pushing switch 434 outputs "1" which indicates that the switch is turned on.

Thus, whether or not the disk cartridge 1 is inserted can be determined by examining whether the output of the pushing switch 434 is "0" or "1".

The drive apparatus 300 is also equipped with a mechanism for detecting the movement of the slide plate 452. Referring to FIGS. 2A and 2B, the movement detecting mechanism includes a switch plate 438 fixed to the slide plate 452 and a pushing switch 440 to be turned on and off by the switch plate 438.

Where the slide plate 452 is situated in a rear position, the pin 440a of the pushing switch 440 projects as shown in FIGS. 2A and 2B, and the pushing switch 440 outputs "0" which indicates that the switch 440 is turned off.

When the slide plate 452 is moved toward the front side of the drive apparatus 300, the pin 440a of the pushing switch 440 is pushed by the switch plate 438, and the pushing switch 440 outputs "1" which indicates that the switch is turned on.

Thus, whether the slide plate 452 is situated in the rear position or in the front position can be determined by examining whether the output of the pushing switch 440 is "0" or "1".

Referring then to FIGS. 2A, 2B and 6, a mechanism for positioning the disk cartridge and a mechanism for detecting the raised position of a positioning pin will be described.

The drive apparatus has vertically movable blocks 470 located at opposite front end portions thereof under the cartridge holder 402. Each of the blocks 470 has a rotatable pin 472 provided on an inner side portion thereof. The slide plate 452 has a trapezoidal cam 462 to be brought into contact with the pin 472 and then raise the same.

As is shown in FIG. 6, the left vertically movable block 470 in FIG. 2A has an upper surface thereof provided with a positioning pin 474 and a pushing switch 476 with two switch elements 476a and 476b. Similarly, the right block 470 has an upper surface thereof provided with a positioning pin 474 and a pushing switch 478 with two switch elements 478a and 478b.

When the disk cartridge 1 is inserted, the slide plate 452 is moved toward the front side of the drive apparatus. At this time, the cam 462 of the slide plate 452 pushes up the pin 472, thereby the vertically movable blocks 470 is raised. Since four guide pins 471 planted on the base 450 extend through the blocks 470, the blocks 470 vertically move. Although in the apparatus shown in FIGS. 2A, 2B and 6, the cam 462 is provided only at one side of the block 470, two cams may be provided at both sides of the block, respectively. In this case, the vertical movement of the blocks 470 is further stabilized.

Further operations of the drive apparatus differ between the case where a double-sided disk cartridge is inserted and the case where a single-sided disk cartridge is inserted. Therefore, the two different cases will be referred to individually.

Where a double-sided disk cartridge is inserted, the positioning pins 474 of the vertically movable blocks 470 are fitted in an alignment hole 38 and a positioning hole 40 (see FIGS. 11 and 12) of the disk cartridge, thereby the cartridge is held in a predetermined position.

The pushing switch 476 provided on the left vertically movable block 470 generates an output indicating whether the double-sided disk cartridge is in a write enable state or in a write protect state. Specifically, each of the switch elements 476a and 476b outputs "1" which indicates the on-state thereof, or "0" which indicates the off-state thereof. The output of the switch 476 consists of a combination of outputs of the switch elements 476a and 476b. Thus, the output of the switch 476 is "1, 0" or "0, 1", which indicates the write enable state or the write protect state. Whether or not that surface of a magneto-optical disk contained in the double-sided disk cartridge, which is opposed to the optical head of the drive apparatus is in the write enable state or in the write protect state can be determined by detecting the output of the pushing switch 476.

Since the double-sided disk cartridge has erroneous erasure preventing mechanisms 42 and 44 and through holes 46 and 48 (see FIGS. 11 and 12) on its both sides, respectively, the output of the pushing switch 478 of the right block 470 is "0, 1", with the result that the drive apparatus recognizes that the inserted cartridge is of the double-sided recording type. Upon recognizing that the double-sided disk cartridge is inserted, a spindle cup or turn table, which will be described later, is raised to chuck the magneto-optical disk contained in the disk cartridge.

The case where a single-sided disk cartridge is inserted will now be explained. The single-sided disk cartridge can be inserted upside down. Because of this, the case where the cartridge is inserted correctly and the case where it is inserted upside down will be referred to individually.

When the single-sided disk cartridge is inserted correctly, the positioning pins 474 of the vertically movable blocks 470 are received in the alignment hole 138 and the positioning hole 140 of the cartridge, thereby the cartridge is held in a predetermined position. The output of the pushing switch 476 is "1, 0" or "0, 1", depending on whether the cartridge is in the write enable state or in the write protect state. Accordingly, whether the inserted single-sided disk cartridge is in the write enable state or in the write protect state is determined by detecting the output of the pushing switch 476.

Since the single-sided disk cartridge is provided with the erroneous erasure preventing mechanism 142 only on one side (see FIG. 17), the pushing switch 478 outputs "1, 1" when it contacts that side of the cartridge which has no erroneous erasure preventing mechanism. Accordingly, it is recognized that the inserted disk cartridge is of the single-sided recording type and is correctly inserted. When the drive apparatus recognizes correct insertion of the single-sided disk cartridge, the spindle cup is raised to chuck the magneto-optical disk.

On the other hand, when the single-sided disk cartridge is inserted upside down, no alignment hole 138 and positioning hole 140 are found on the cartridge surface facing to the blocks 470. Accordingly, the tips of the positioning pins 474 are brought into contact with the case 102, and the blocks 470 do not rise any higher. As a result, the output of the pushing switch 478 is "0, 0", which indicates that the inserted disk cartridge is of the single-sided recording type and is inserted upside down. When the drive apparatus recognizes wrong insertion of the single-sided disk cartridge, it does not raise the spindle cup, and discharges the cartridge with a disk cartridge discharge mechanism 480, which will be described below.

In the embodiment, whether or not the single-sided disk cartridge is correctly inserted is detected on the basis of the output of the pushing switch 478. However, this detection may evidently be performed on the basis of the output of the pushing switch 476. In this case, the output "1, 0" or "0, 1" indicates correct insertion, and the output "0, 0" indicates upside-down insertion. The detection may also be performed on the basis of both the outputs of the pushing switches 476 and 478.

As is shown in FIG. 2A, the disk cartridge discharge mechanism 480 includes a discharge motor 482, a cam 486 rotatably mounted on the base 450, a gear 484 for transmitting the driving force of the discharge motor 482 to the cam 486, and a cam receiver 464 formed of an edge portion of the slide plate 452 for receiving the cam 484.

The drive of the discharge motor 482 rotates the cam 486. The cam 486 contacts the cam receiver 464 of the slide plate 452, which has been moved toward the front side of the drive apparatus 300, and pushes back the slide plate 452. As a result, the slide plate 452 assumes a state as shown in FIG. 5B. Since the disk cartridge is urged in the direction of discharge by the force of the spring 436 with the pivoting chip 430a of the trigger arm 430, the disk cartridge will be discharged. Upon discharging the cartridge, the trigger arm 430 will rotate and return to the initial state shown in FIG. 5A.

After confirmation of the correct insertion of the disk cartridge, a spindle cup incorporated in a disk rotation unit 500 is raised to hold and rotate a magneto-optical disk contained in the disk cartridge. The disk rotation unit 500 will be described with reference to FIG. 7.

The disk rotation unit or spindle motor 500 for rotating the magneto-optical disk 2 of the disk cartridge 1 is fixed to the flange portion of the base 450 by means of a screw, etc. The spindle motor 500 has a spindle cup 530 attached to a spindle shaft 522. The spindle cup 530 is engaged with a plurality of keys 526 provided on the periphery of he spindle shaft 522, such that it is not rotatable but axially movable with respect to the spindle shaft 522. The spindle cup 530 is urged downward by a flange 524 fixed to the spindle shaft 522 and a coil spring 528.

A permanent magnet 532 is secured to the lower surface of the spindle cup 530, while an electromagnet 534 is attached to the surface that faces to the permanent magnet 532. The electromagnet 534 is coated with plastic, to prevent such direct contact between the electromagnet and the permanent magnet 532, as may cause wear or wire breaking of the electromagnet. A yoke 536 and a permanent magnet 538 are provided in a recess formed in the upper surface of the spindle cup 530, to hold the hub 8 of the magneto-optical disk 2 of the mounted disk cartridge 1.

The spindle motor 500 operates as follows:

After the disk cartridge 1 is inserted, and the fact that the disk cartridge 1 is positioned by the positioning pin 474 is confirmed by the outputs of the pushing switches 476 and 478, the electromagnet is excited.

The spindle cup 530 is raised by the repulsive force which exerts between the electromagnet 534 and the permanent magnet 532 and exceeds the downwardly urging force of the coil spring 528. Subsequently, the spindle cup 530 attracts and holds the hub 8 of the magneto-optical disk 2 by means of the magnetic force of the permanent magnet 538 received in the recess in the upper surface thereof.

Referring then to the flowchart of FIG. 8, the operation of the above-described apparatus will be explained. After the power supply is turned on, the drive apparatus assumes a stand-by state for receiving a disk cartridge (S1). The drive apparatus determines, by examining the output of the pushing switch 434, whether or not a disk cartridge is inserted (S2). When the output of the pushing switch 434 is "0" which indicates that the switch is in the off-state, the drive apparatus determines that no disk cartridge is inserted. On the other hand, when the output of the pushing switch 434 is "1" which indicates that the switch is in the on-state, the drive apparatus determines that a disk cartridge is inserted.

Subsequently, the drive apparatus determines, by examining the output of the pushing switch 478, whether or not the disk cartridge is correctly inserted (S3). If the output of the pushing switch 478 is "0, 0", the drive apparatus determines that the inserted disk cartridge is of a single-sided recording type and inserted upside down.

If the single-sided disk cartridge is inserted upside down, the drive apparatus controls the disk cartridge discharge mechanism 480 to discharge the disk cartridge (S4).

Where the disk cartridge is correctly inserted, the drive apparatus examines the output of the pushing switch 478, thereby determining whether the inserted disk cartridge is of the single-sided recording type or of the double-sided recording type (S5). If the output of the pushing switch 478 is "0, 1", the drive apparatus determines that the inserted disk cartridge is of the double-sided recording type. If the output of the pushing switch 478 is "1, 1", the drive apparatus determines that the inserted disk cartridge is of the single-sided recording type.

Where the double-sided or single-sided disk cartridge is correctly inserted, the drive apparatus raises the spindle cup 530 to chuck the magneto-optical disk contained in the disk cartridge (S6).

As is evident from the above explanation, the type of the inserted disk cartridge is recognized on the basis of the output of the pushing switch 478. If the output is "0, 1", it is determined that the double-sided disk cartridge is inserted. If the output is "0, 0" or "1, 1", it is determined that the single-sided disk cartridge is inserted. Further, the output "1, 1" indicates that the single-sided disk cartridge is correctly inserted, while the output "0, 0" indicates that the single-sided disk cartridge is inserted upside down.

The invention is not limited to the above-described embodiment, but may be modified in various manners. For example, the drive apparatus may employ a photo-reflector in place of the pushing switch 478. In this case, the state of the disk cartridge is recognized by measuring the distance thereto. Specifically, when the reflector detects that the distance to the disk cartridge is relatively long, the drive apparatus recognizes that the disk cartridge which contains a single-sided recording disk is inserted upside down. Although in this case, the type of the inserted disk cartridge cannot be recognized, there is no problem in practice since whether or not the disk cartridge is correctly inserted can be recognized.

Further, although in the embodiment, whether or not the vertically movable blocks are raised, i.e. whether or not the inserted disk cartridge is in a correct state is determined from the output of the pushing switch 478 provided on the right vertically movable block 470, the embodiment can be modified such that this determination is performed only on the basis of the output of the pushing switch 440. The pushing switch 440 detects the movement of the slide plate 452. Since the vertically movable blocks 470 are raised in accordance with the movement of the slide plate 452, whether or not the blocks 470 are raised, i.e. whether or not the disk cartridge is correctly inserted can be determined by detecting whether the output of the pushing switch 440 is "1" which indicates the on-state of the switch 440, or "0" which indicates the off-state of the same. The flowchart of FIG. 9 illustrates the operation of the modification.

Where correct insertion of the disk cartridge is determined using the pushing switch 440, the drive apparatus can dispense with the pushing switch 478. In other words, to detect whether or not the disk cartridge is correctly inserted, it suffices if the drive apparatus may employ only one of the pushing switches 440 and 478.

Figure 10:
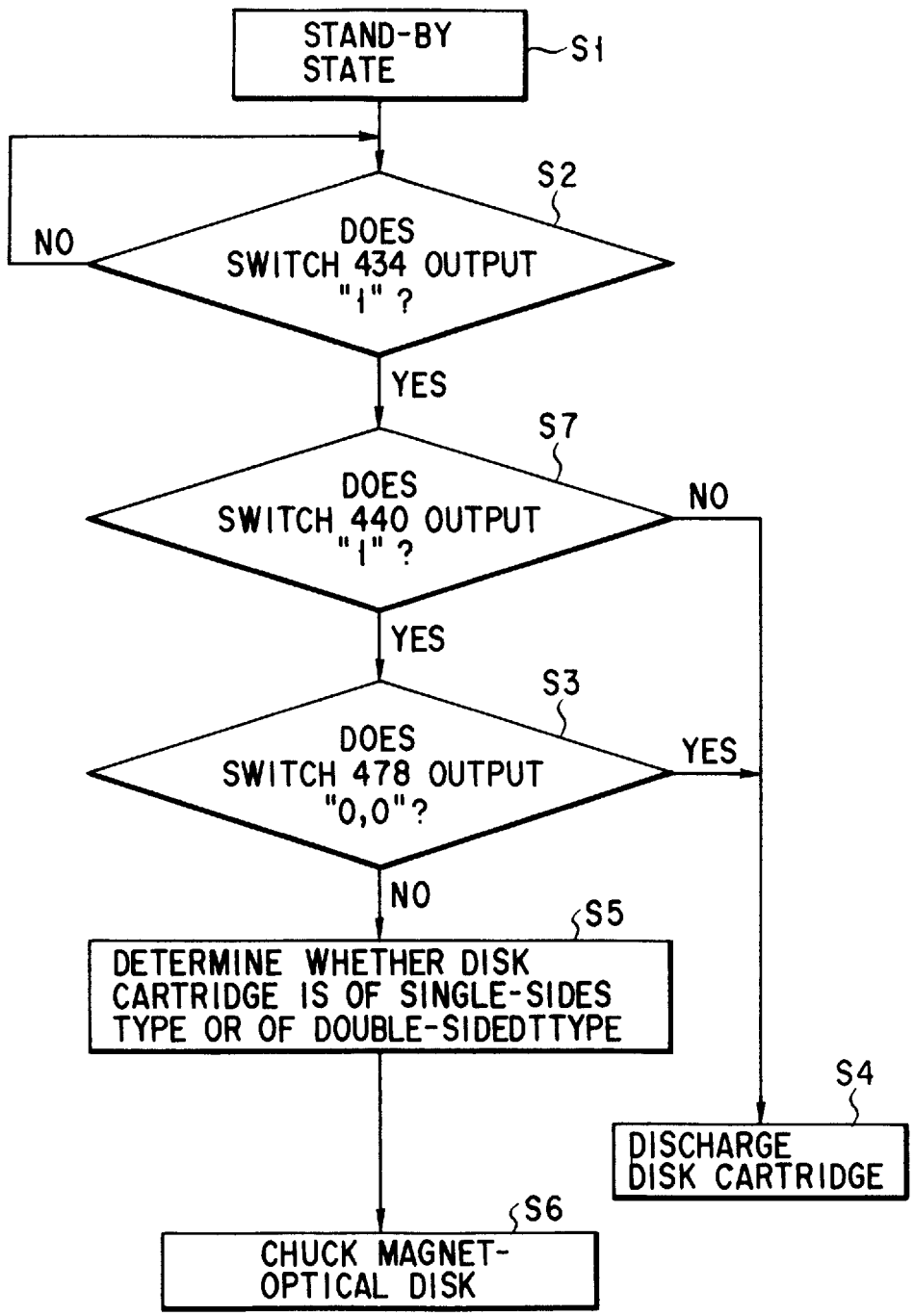
FIG. 10 is a flowchart, illustrating a further operation of the drive apparatus of the invention.

Moreover, it is a matter or course that whether or not the disk cartridge is correctly inserted can be determined using both the outputs of the pushing switches 440 and 478. The operation of this case is illustrated in FIG. 10.

Furthermore, although in the embodiment, the turn table is raised up to the disk cartridge, the invention is also applicable to a drive apparatus wherein the disk cartridge is raised up to the turn table (see, for example, Japanese Patent Application KOKOKU Publication No. 1-35415).

In addition, although the drive apparatus employed in the embodiment is adapted to 3.5-inch magneto-optical disk cartridges, the invention is not limited to this. The disk cartridge is not limited to a 3.5-inch type, and the recording medium contained in the disk cartridge is not limited to the magneto-optical disk. In summary, the invention is applicable to any type of drive apparatus which is adapted to drive a cartridge equipped with a hole for receiving the positioning pin of the drive apparatus.

The double-sided disk cartridge applicable to the above-described drive apparatus will be described in more detail with reference to the drawings.

Figure 11:
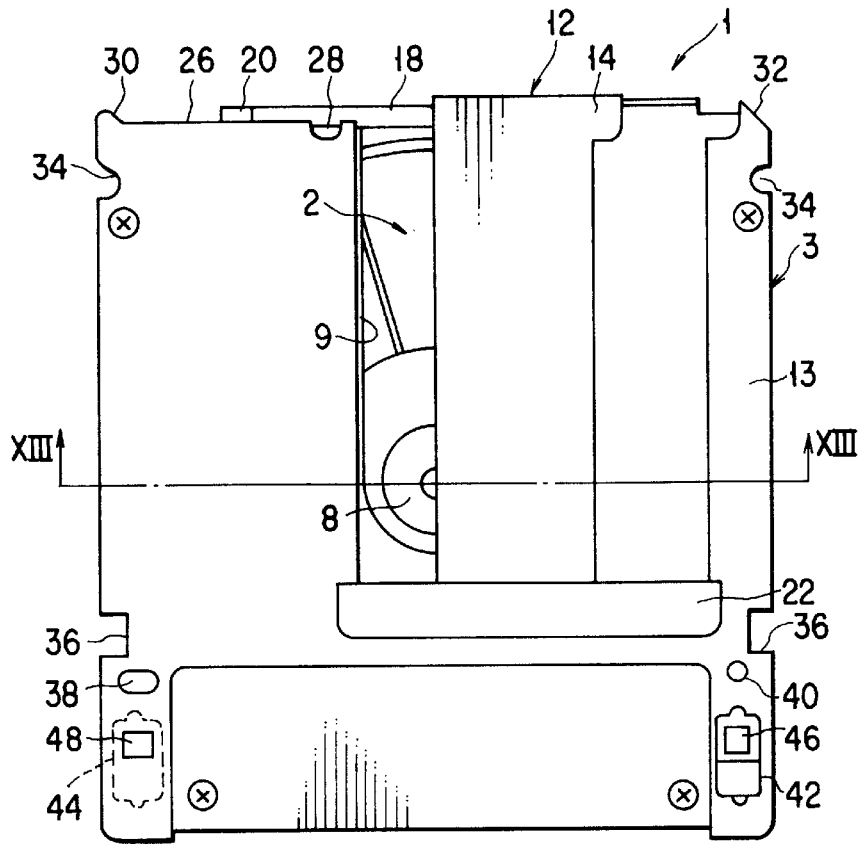
FIG. 11 is a front view of a double-sided disk cartridge which is applicable to the drive apparatus of the invention.
Figure 12:
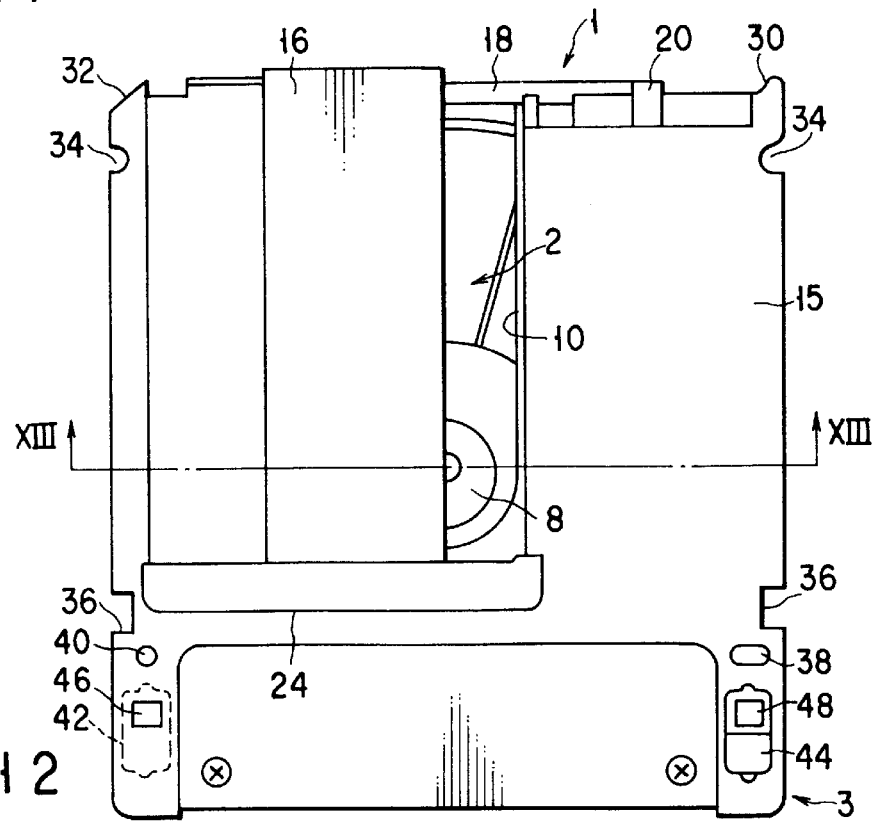
FIG. 12 is a rear view of the double-sided disk cartridge of FIG. 11.

As is shown in FIGS. 11 and 12, a double-sided disk cartridge 1 contains a 3.5-inch double-sided magneto-optical disk 2, and has substantially the same configuration and size as those of the conventional single-sided disk cartridge with a single-sided magneto-optical disk. It is a matter of course that the double-sided disk cartridge 1 differs in structure from the conventional single-sided one in that the former has openings formed in both sides, respectively. However, since the double-sided disk cartridge 1 has the same size as the single-sided one, it is easy to make the drive apparatus applicable to both of them.

The disk cartridge 1 has the double-sided disk 2, and a case 3 which contains the disk 2 rotatably. As is shown in FIG. 13, the double-sided disk 2 comprises two disk-shaped cover glasses 4 and 6 each having a thickness of 0.6 mm and a central hole, and a recording layer 7 interposed therebetween. Data can be written into and read from both surfaces of the recording layer 7. Since the recording layer 7 is so thin that its thickness can substantially be ignored, the thickness D of the double-sided disk 2 is considered to be equal to the sum of the thicknesses of the two cover glasses 4 and 6 (0.6+0.6=1.2 mm). The thickness D is equal to the thickness of the conventional single-sided disk (formed of a cover glass with a thickness of 1.2 mm).

An annular hub 8 made of a magnetic material is provided on a central portion of each of the cover glasses 4 and 6. The hub 8 has an inner diameter Ri of 4 mm, an outer diameter Ro of 15 mm, and a thickness T of 1.2 mm. The dimension H between the upper surface of the hub 8 and the recording layer 7 is 1.8 mm.

The case 3 has a pair of rectangular case elements 13 and 15, which define an inner space wherein the double-sided disk 2 is rotatably contained. The minimum dimension K between the inner walls of the inner space defined by the case elements 13 and 15 is 1.6 mm–2.0 mm, which is larger by 0.4–0.8 mm than the thickness D (1.2 mm) of the double-sided disk 2. FIG. 12 shows a case where the dimension K is 2.0 mm.

A clearance of 0.2–0.4 mm is defined between each surface of the double-sided disk 2 and a corresponding projection 11 of the case elements 13 and 15 (see FIG. 15), to prevent the disk 2 from contacting the projections 11 while the disk is rotated or the disk cartridge is carried. A dimension K' between those inner wall portions of the inner space which are other than the projections 11 is larger than the minimum dimension K by the sum of the heights of both the projections 11 (when K =2.0 mm, K'=2.2 mm).

As is shown in FIG. 11, the case element 13 has an opening 9 for exposing the recording area of one side of the double-sided disk 2 and the hub 8 corresponding thereto. On the other hand, as is shown in FIG. 12, the case element 15 has an opening 10 for exposing the recording area of the other side of the double-sided disk 2 and the hub 8 corresponding thereto. The case 3 has a shutter 12 for closing the openings 9 and 10, as is shown in FIG. 11. The shutter 12 includes a shutter plate 14 for closing the opening 9 of the case element 13, and a shutter plate 16 for closing the opening 10 of the case element 15. The shutter plates 14 and 16 are coupled with each other by a coupling member 18. This shutter structure is constructed such that the coupling member 18 is movable along the front face 26 of the case 3, and urged by a spring (not shown) so as to close the openings 9 and 10 by means of the shutter plates 14 and 16, respectively.

The case elements 13 and 15 have shutter keep plates 22 and 24 for keeping ends of the shutter plates 14 and 16, respectively. Further, as is shown in FIG. 13, the thin portion of the disk cartridge 1, along which the shutter plates 14 and 16 are movable, has a thickness U of 5.0 mm, and the thick portions on both sides of the thin portion has a thickness N of 6.0 mm.

The case 3 has a recess 28 formed in the front face 26 for receiving the shutter releasing pin of the drive apparatus after the shutter is opened. The case 3 also has a projection 30 at that end of the front face 26, close to which the tip 20 of the coupling member 18 is situated. The projection 30 has an inclined surface whose normal line is directed inward. The case 3 further has an inclined surface portion 32 at the end of the front face 26 opposite to the first-mentioned end. The inclined surface portion 32 has an inclined surface whose normal line is directed outward.

The case 3 has semicircular recesses 34 formed in opposite side portions thereof close to the front face 26 for receiving the cartridge fixing pins of the drive apparatus. The recesses 34 are formed through the case elements 13 and 15, respectively. The case 3 has rectangular recesses 36 formed in opposite side portions thereof located rearward of the semicircular recesses 34. The case elements 13 and 15 each have an alignment hole 38 and a positioning hole 40 a plurality of first recesses, for receiving a pair of horizontally positioning pins of the drive apparatus, respectively, when the disk cartridge 1 is loaded in the drive apparatus. Further, the case element 13 has an erroneous erasure preventing mechanism 42 located rearward of the positioning hole 40, while the case element 15 has an erroneous erasure preventing mechanism 44 located rearward of the positioning hole 40.

The erroneous erasure preventing mechanism 42 comprises a recess 43 with a through hole 46 and forming a second recess (not shown). Likewise, the erroneous erasure preventing mechanism 44 comprises a recess 43 with a through hole 48 and a slider 45 for closing the through hole 48 and forming a recess 47 (shown in FIG. 12).

As is shown in FIG. 14, each hub 8 has a metallic material, such as a ferromagnetic material, buried therein. To attach the hubs 8 to both surfaces of the double-sided disk 2, respectively, the hubs 8 are pressed against the surfaces of the disk 2 as indicated by the arrows, and fixed thereto by fusion or by an adhesive.

FIG. 15 shows the structure and the dimensions of the above-described essential part. As is indicated in FIG. 15, the thickness D of the double-sided disk 2 of a double-sided recording type is 1.2 mm, which is equal to the thickness of the conventional single-sided disk. The inner space of the case 3 is defined such that the inner surfaces of the shutter plates 14 and 16 do not contact the outer surfaces of the hubs 8.

The thickness T of the hub 8 is set to 1.2 mm, which is equal to the thickness of the hub attached to the conventional single-sided disk. The dimension between the inner walls of the case 3, i.e. the minimum dimension K of the inner space in the thickness direction, is set to 1.6 to 2.0 mm such that the inner surfaces of the shutter plates 14 and 16 do not contact the outer surfaces of the hubs 8. As a result, a clearance of 0.5 to 0.3 mm is securely defined between the inner surfaces of the shutter plates 14 and 16 and the outer surfaces of the hubs 8. The dimension K secures a clearance of 0.2 to 0.4 mm between each surface of the disk 2 and the case 3, which permits surface vibration of the disk 2. Such a disk as will cause surface vibration with an amplitude of 0.2 mm or more on one side is not suitable to highly accurate recording/reproducing of data, and hence is not put to practice.

It is preferable to set, to 0.5 mm, the clearance between the inner surfaces of the shutter plates 14 and 16 and the outer surfaces of the hubs 8. In this preferable case, the dimension K is 2.0 mm. If, on the other hand, the clearance is set to 0.3 mm, the dimension K is 1.6 mm.

The above-described setting secures a space which prevents contact between the hubs 8 and the shutter plates 14 and 16, and a clearance which prevents contact between the double-sided disk 2 and the case 3 due to surface vibration of the disk 2. The double-sided disk cartridge 1 with the above-described structure and dimensions has substantially the same configuration and dimensions as the conventional single-sided disk cartridge, and therefore can employ many of the components included in the conventional single-sided disk cartridge with the single-sided disk. This being so, the double-sided cartridge can be produced at low cost.

Also, since in the double-sided disk cartridge 1, the case 3 is set to the same thickness as the case of the conventional single-sided disk cartridge by setting a clearance between the case 3 and the double-sided disk 2 smaller than the clearance in the single-sided disk cartridge, the space required to contain the double-sided disk cartridge 1 is as small as that required to contain the single-sided disk cartridge.

In addition, the drive apparatus for driving the double-sided disk cartridge 1 can be produced at relatively low cost since many components included in the driving apparatus for the conventional single-sided disk cartridge can also be used to produce the first-mentioned drive apparatus.

Referring then to FIGS. 16A and 16B, a description will be given of an optical system incorporated in a drive apparatus 51 which can record and reproduce data when the disk cartridge 1 with the double-sided disk 2 capable of double-sided recording is mounted therein, and can reproduce data when the disk cartridge with the conventional single-sided disk is mounted therein.

As is shown in FIG. 16A, the drive apparatus 51 has an optical head 53 to be opposed to a disk 52, such as a single-sided disk or a double-sided disk, mounted on a turn table. The optical head 53 comprises a semiconductor laser 54 for emitting a light beam, a beam splitter 55 for splitting the light beams to and from the disk 52, an objective lens 56 for converging the light beam on the disk 52, a hologram 57 formed on an objective lens surface which is closer to the semiconductor laser 54, an analyzer 58 formed of a plane parallel plate obtained by attaching a wedge-shaped glass prism to wedge-shaped crystal, a two-part photodetector 59 and a four-part photodetector 60 formed integral with the photodetector 59.

As is shown in FIG. 16B, the photodetectors 59 and 60 are connected to a subtracter 61 and an adder 62. The subtracter 61 generates a reproduction signal (MO signal) indicative of data stored in a magneto-optical recording data section, while the adder 62 generates a reproduction signal indicative of data stored in a pre-format for magneto-optical recording or for a CDROM.

A light beam emitted from the semiconductor laser 54 passes the beam splitter 55 and goes to the objective lens 56. Light passing through the outside of the hologram 57 and the 0th-order light of the hologram 57 are converged by the objective lens 56 on a plane above from the lower disk surface by 0.6 mm, as is indicated by the solid line. On the other hand, the first-order light of the hologram 57 is converged on a plane above from the lower disk surface by 1.2 mm, as is indicated by the two-dot chain line. In the case where a CDROM or a single-sided disk is mounted in the drive apparatus, data stored therein is reproduced by means of the first-order light of the hologram 57. In the case where a double-sided disk is mounted in the drive apparatus, data is recorded/reproduced by light passing through the outside of the hologram 57 and the 0th-order light of the hologram 57.

Light returned from the single-sided or double-sided disk and having the Kerr rotational component is guided through the objective lens 56, then reflected by the beam splitter 55, and split by the analyzer into normal light and abnormal light. The normal light enters the four-part photodetector 60, while the abnormal light enters the two-part photodetector 59.

A focus error signal is detected from the normal light by the astigmatism method, and a tracking error signal is detected from the abnormal light by the push-pull method. As regards information signals, a reproduction signal indicative of data stored in a pre-format for magneto-optical recording or for a CDROM is detected by the adder 62, while a reproduction signal or MO signal indicative of data stored in a magneto-optical recording data section is detected by the subtracter 61.

Although in this optical system, the hologram is attached to that surface of the objective lens which is close to the light source, two objective lens having different NAs and focus positions may be employed in place of the objective lens with the hologram.

Furthermore, although the magneto-optical disk has been taken as an example of the recording medium, a phase variation type recording medium may be used in place of it. In this case, the optical system shown in FIG. 16A employs a ¼ wavelength plate interposed between the objective lens 56 and the beam splitter 55.

Instead of using the two-focus optical system shown in FIG. 16A, the drive apparatus may have a mechanism for shifting the disk-mounting position depending upon whether the mounted disk is of the single-sided type or of the double-sided type. More specifically, the drive apparatus may have a mechanism for mounting a double-sided disk in a position remoter from the objective lens by about 0.4 mm (in the case where the refractive index of the cover glass is 1.5) than in the case of mounting a single-sided disk. The drive apparatus with this mechanism can perform recording and reproducing of data in both the single-sided disk and the double-sided disk.

The disk-shaped optical recording media capable of recording and reproducing data, such as a magneto-optical disk and a phase variation type recording medium for recording data using phase variation, include an additional recording type optical disk, a read-only optical disk (CDROM), etc.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

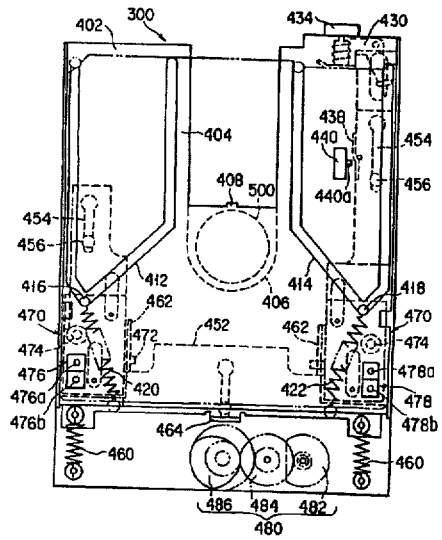

What is claimed is:

1. A drive apparatus for driving a disk cartridge which contains a rotatable disk-shaped data recording disk, said drive apparatus being capable of driving both a first disk cartridge of a first disk cartridge type and a second disk cartridge of a second disk cartridge type, wherein:

the first disk cartridge comprises a single-sided disk capable of holding data on one side thereof and a case which contains the single-sided disk, said single-sided disk having a hub on a central portion of the one side thereof which is capable of holding data, and said case having a plurality of first recesses formed on one side thereof, a first through hole positioned at a predetermined distance from a center line extending in an insertion direction, and a slider mechanism including a slider movable between a first position in which said first through hole is open and a second position in which said first through hole is closed and a second recess is formed; and the second disk cartridge comprises a double-sided disk capable of holding data on both sides thereof, and a case which contains the double-sided disk, said double-sided disk having a hub on a central portion of both sides thereof, and said case having a plurality of first recesses formed in both sides thereof, two first through holes symmetrically positioned at the predetermined distance from the center line extending in the insertion direction, and two slider mechanisms each including a slider movable between a first position in which said two first through holes are open and a second position in which said two first through holes are closed and a second recess is formed;

said drive apparatus comprising:
a cartridge holder for receiving an inserted one of said first and second disk cartridges;

a projection section having a first projection for engaging with one of the first recesses of the inserted disk cartridge;

a movement mechanism for moving the projection section toward the inserted disk cartridge to make the projection section contact the inserted disk cartridge when the inserted disk cartridge is situated in a disk cartridge insertion completion position of the cartridge holder;

a first detector located in a vicinity of the first projection;

a turn table for holding the hub of the single-sided disk of the first disk cartridge when the first disk cartridge is inserted, and for holding one of the hubs of the double-sided disk of the second disk cartridge when the second disk cartridge is inserted; and a driver for driving the turn table in a predetermined direction such that the turn table approaches the disk of the inserted disk cartridge, wherein the movement mechanism includes:

a first block movable toward and away from the inserted disk cartridge;

a slide member movable in a first direction when the inserted disk cartridge has been inserted, and movable in a second direction when the inserted disk cartridge is discharged, said slide member having a first cam for contacting and raising a first pin on an inner portion of said first block when the slide member has been moved in the first direction;

an elastic member urging the slide member in the first direction; and a trigger member engaged with the slide member for maintaining a position of the slide member in the second direction against the force of said elastic member when the inserted disk cartridge has been discharged.

2. The drive apparatus according to claim 1, wherein the first detector includes a pushing switch which operates in a direction parallel to a direction of extension of the first projection.

3. The drive apparatus according to claim 2, wherein the first detector detects whether or not the first projection is engaged with one of the first recesses of the inserted disk cartridge based on an operation of the pushing switch.

4. The drive apparatus according to claim 1, wherein the movement mechanism further comprises a second block movable toward and away from the inserted disk cartridge, and wherein said slide member includes a second cam for contacting and raising a second pin on an inner portion of the second block when the slide member has been moved in the first direction.

5. The drive apparatus according to claim 4, wherein the first detector comprises a pushing switch including two switch elements which operate in a direction parallel to a direction of extension of the first projection, said two switch elements being situated at locations corresponding to the second recess and the first through hole of the inserted disk cartridge.

6. The drive apparatus according to claim 5, wherein the first detector and the first projection are located on the first block.

7. The drive apparatus according to claim 6, wherein the first detector detects whether or not the first projection is engaged with one of the first recesses of the inserted disk cartridge, and whether the inserted disk cartridge is in a write enable state or in a write protect state, based on an operation of the two switch elements.

8. The drive apparatus according to claim 7, wherein the projection section includes a second projection positioned opposite the first projection with respect to the center line for engaging with another one of the first recesses of the inserted disk cartridge, and wherein said drive apparatus further comprises a second detector located in a vicinity of the second projection.

9. The drive apparatus according to claim 8, wherein the second detector comprises a pushing switch including two switch elements which operate in a direction parallel to a direction of extension of the second projection, said two switch elements being situated at locations corresponding to the second recess and the first through hole of the inserted disk cartridge.

10. The drive apparatus according to claim 9, wherein the second detector and the second projection are located on the second block.

11. The drive apparatus according to claim 10, wherein the second detector detects whether or not the first and second projections are engaged with the respective first recesses of the inserted disk cartridge, and detects whether the inserted disk cartridge is of the first disk cartridge type or the second disk cartridge type, based on an operation of the switch elements of the second detector.

12. The drive apparatus according to claim 11, wherein the first and second projections of the projection section each comprise a positioning pin for engaging with a corresponding one of the first recesses of the inserted disk cartridge for positioning the inserted disk cartridge.

13. The drive apparatus according to claim 12, wherein the projection amount of each switch element of the first and second detectors is smaller than the projection amount of the first and second projections of the projection section.

14. The drive apparatus according to claim 13, further comprising a third detector for detecting that the inserted disk cartridge is situated in the insertion completion position.

15. The drive apparatus according to claim 1, wherein the movement mechanism further comprises a disengagement member for disengaging the slide member from the trigger member when the inserted disk cartridge is situated in the insertion completion position.

16. The drive apparatus according to claim 15, further comprising a slide detector for detecting a movement of the slide member.

17. The drive apparatus according to claim 16, wherein the turn table operates responsive to said first and second projections engaging with the respective first recesses of the inserted disk cartridge.

18. The drive apparatus according to claim 17, wherein the driver operates responsive to an output from the first detector.

* * * * *

UNITED STATES PATENT AND TRADEMARK OFFICE
CERTIFICATE OF CORRECTION

PATENT NO. : 5,808,997
DATED : September 15, 1998
INVENTOR(S) : Kunio YAMAMIYA

It is certified that error appears in the above-identified patent and that said Letters Patent is hereby corrected as shown below:

The title page, should be deleted to appear as per attached title page.

The sheets of drawings consisting of figures 2A, 11 and 12 should be deleted to appear as per attached sheets.

Signed and Sealed this

Twenty-ninth Day of August, 2000

Attest:

Q. TODD DICKINSON

*Attesting Officer*   *Director of Patents and Trademarks*

United States Patent [19]

Yamamiya

[11] Patent Number: 5,808,997
[45] Date of Patent: Sep. 15, 1998

[54] DISK DRIVE APPARATUS CAPABLE OF RELIABLY RECEIVING DISK CARTRIDGES HAVING BOTH SINGLE AND DOUBLE SIDED DISKS

[75] Inventor: Kunio Yamamiya, Sagamihara, Japan

[73] Assignee: Olympus Optical Co., Ltd., Tokyo, Japan

[21] Appl. No.: 669,910

[22] Filed: Jun. 25, 1996

[30] Foreign Application Priority Data

Jun. 27, 1995 [JP] Japan ................................. 7-160864
Aug. 22, 1995 [JP] Japan ................................. 7-213673

[51] Int. Cl.$^6$ ............................................. G11B 17/04
[52] U.S. Cl. ............................................. 369/77.2
[58] Field of Search ..................... 369/75.1, 75.2, 369/77.1, 77.2; 360/99.02, 99.06

[56] References Cited

U.S. PATENT DOCUMENTS

| | | | |
|---|---|---|---|
| 4,890,276 | 12/1989 | Ono et al. | 369/77.2 |
| 5,446,711 | 8/1995 | Yamamiya | 369/44.14 |
| 5,526,342 | 6/1996 | Akiyama et al. | 369/291 |
| 5,583,834 | 12/1996 | Kanada et al. | 369/77.2 |

*Primary Examiner*—Stuart S. Levy
*Assistant Examiner*—George J. Letscher
*Attorney, Agent, or Firm*—Frishauf, Holtz, Goodman, Langer & Chick

[57] ABSTRACT

A drive apparatus has vertically movable blocks on opposite lower front portions of a cartridge holder. On a base incorporated in the drive apparatus, there is provided a slide plate which moves when a disk cartridge is inserted in the drive apparatus. The slide plate has a cam for raising the blocks. A positioning pin and a pushing switch are located on the upper surface of each block. Each pushing switch has two switch elements. That one of the pushing switches which is located on the right block outputs "0, 0" when a single-sided disk cartridge is inserted upside down, "1, 1" when the single-sided disk cartridge is inserted correctly, and "0, 1" when a double-sided disk cartridge is inserted.

18 Claims, 11 Drawing Sheets